United States Patent
Futai (10) Patent No.: US 6,871,858 B2
(45) Date of Patent: Mar. 29, 2005

(54) SHAFT SEALING APPARATUS (75) Inventor: Masanori Futai, Himeji (JP)

(73) Assignee: Daicel Chemical Industries, Ltd., Osaka (JP)

(*) Notice: Subject to any disclaimer, the term of this patent is extended or adjusted under 35 U.S.C. 154(b) by 0 days.

(21) Appl. No.: 09/978,829

(22) Filed: Oct. 15, 2001

(65) Prior Publication Data

US 2004/0119243 A1 Jun. 24, 2004

(30) Foreign Application Priority Data

Oct. 16, 2000 (JP) ........................................ 2000-315518

(51) Int. Cl.⁷ ................................................. F16J 15/16
(52) U.S. Cl. ........................ 277/500; 277/430; 277/543; 366/79
(58) Field of Search ................................ 277/500, 430, 277/571, 585, 910, 543; 366/79

(56) References Cited

U.S. PATENT DOCUMENTS

| | | | |
|---|---|---|---|
| 4,167,339 A | * | 9/1979 | Anders ........................ 366/79 |
| 4,193,696 A | * | 3/1980 | Van Heel et al. ............. 366/66 |
| 4,291,888 A | | 9/1981 | Tanaka et al. |
| 4,334,785 A | * | 6/1982 | Blach ........................... 366/79 |
| 4,463,957 A | | 8/1984 | Nagai et al. |
| 4,471,963 A | | 9/1984 | Airhart |
| 4,723,901 A | * | 2/1988 | Sarumaru .................... 425/208 |
| 5,171,022 A | | 12/1992 | Fessmann |
| 5,356,208 A | * | 10/1994 | Tadmor ........................ 366/79 |
| 5,692,757 A | | 12/1997 | Straub |
| 5,735,603 A | * | 4/1998 | Kesig et al. ................. 366/331 |
| 6,152,454 A | | 11/2000 | Marnot |
| 6,409,177 B1 | | 6/2002 | Johnston |
| 6,457,720 B1 | | 10/2002 | London |

* cited by examiner

Primary Examiner—William L. Miller
(74) Attorney, Agent, or Firm—Meyertons, Hood, Kivlin, Kowert & Goetzel, P.C.; Eric B. Meyertons (57) ABSTRACT A shaft sealing apparatus is provided which can easily be assembled and arranged to prevent leakage of a dope from an acetylator or the like system. A screw sleeve having a spiral groove provided in the outer side thereof is mounted on rotary shaft adjacent to a location where the rotary shaft extends through a housing. As the screw sleeve rotates together with the rotary shaft, it can return back the dope into the housing thus providing a sealing effect. The screw sleeve includes six segments fabricated by separating circumferentially into two and axially into three. The six segments are jointed together to assemble a generally cylindrical structure on the rotary shaft. The assembling process can be conducted from two radial directions on the rotary shaft between the housing and each bearing unit supporting the rotary shaft without disassembling the bearing units.

7 Claims, 9 Drawing Sheets

SHAFT SEALING APPARATUS

TECHNICAL FIELD

The present invention relates to a shaft sealing apparatus for use in a rotary apparatus such as an acetylator in the production of cellulose acetate.

BACKGROUND OF THE INVENTION

Figure 11:
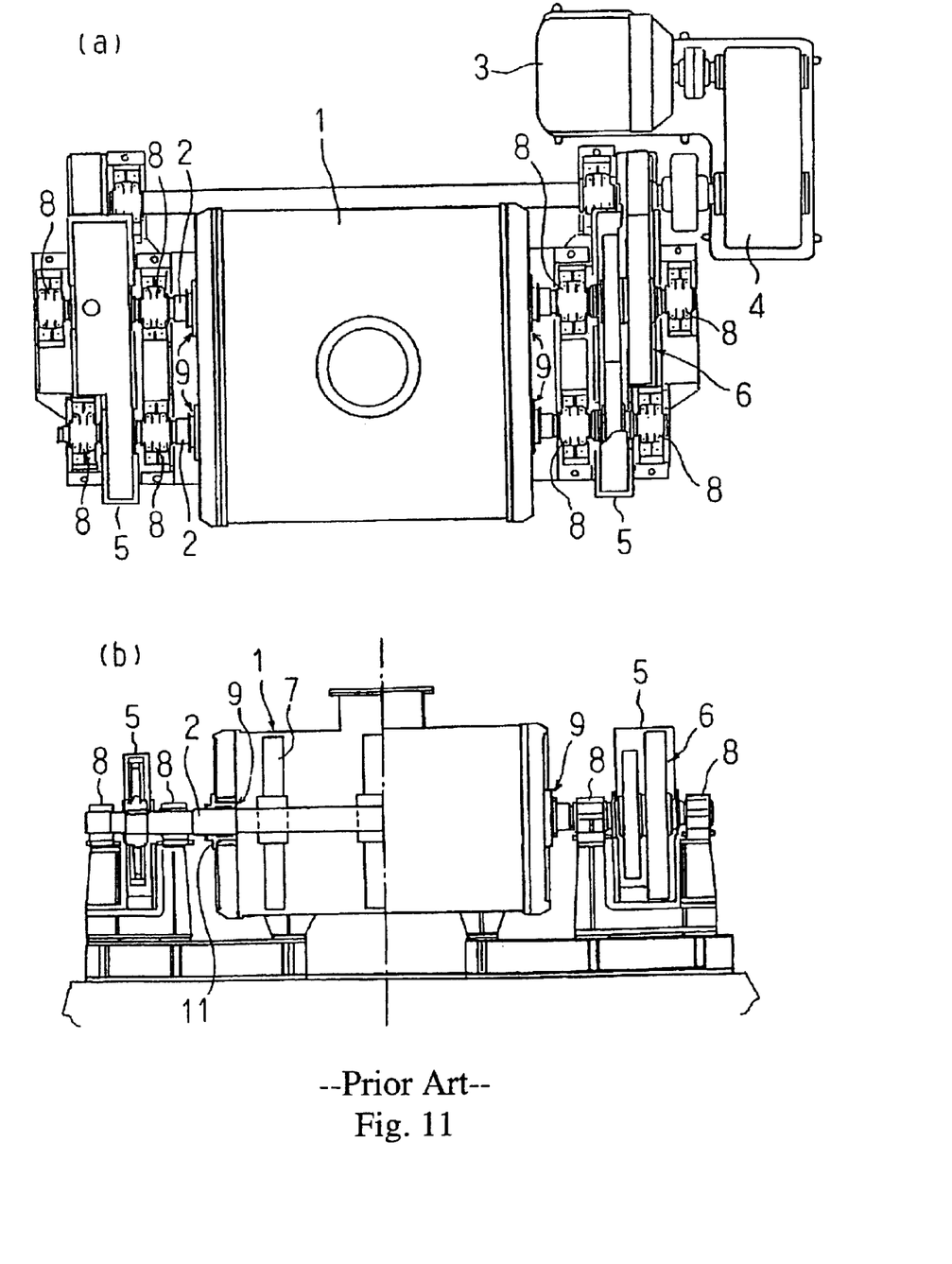
FIG. 11 illustrates a double-screw kneader used as an acetylator in the production of cellulose acetate, FIG. 11(a) being a plan view and FIG. 11(b) being a front view.
Figure 12:
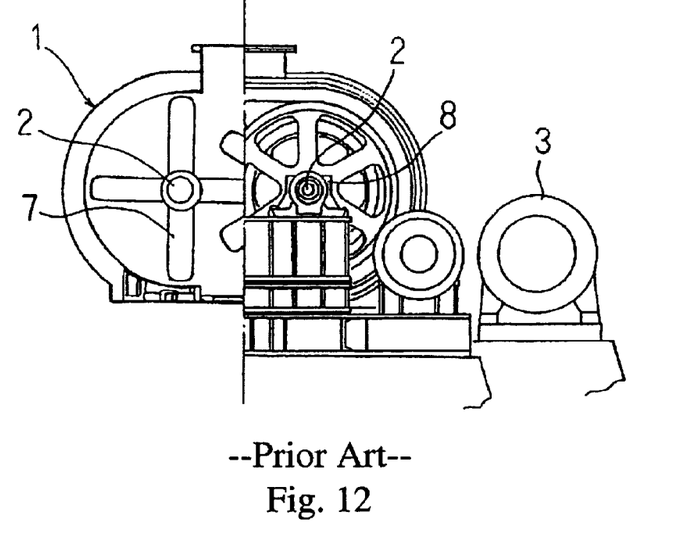
FIG. 12 is a side view of the double-screw kneader.

FIGS. 11(a), 11(b), and 12 illustrate a double-screw kneader used as an acetylator in the production of cellulose acetate. The kneader has two rotary shafts 2 provided extending through a housing 1 thereof which defines a kneading chamber. As the rotary shafts 2 are driven by the rotating force of an electric motor 3 which is transmitted via a speed reducer 4 and groups of gears 6 provided in gear casings 5, their kneading fins 7 rotate in the housing 1 for kneading a highly viscous solution of cellulose derivative (referred to as a dope hereinafter).

Figure 13:
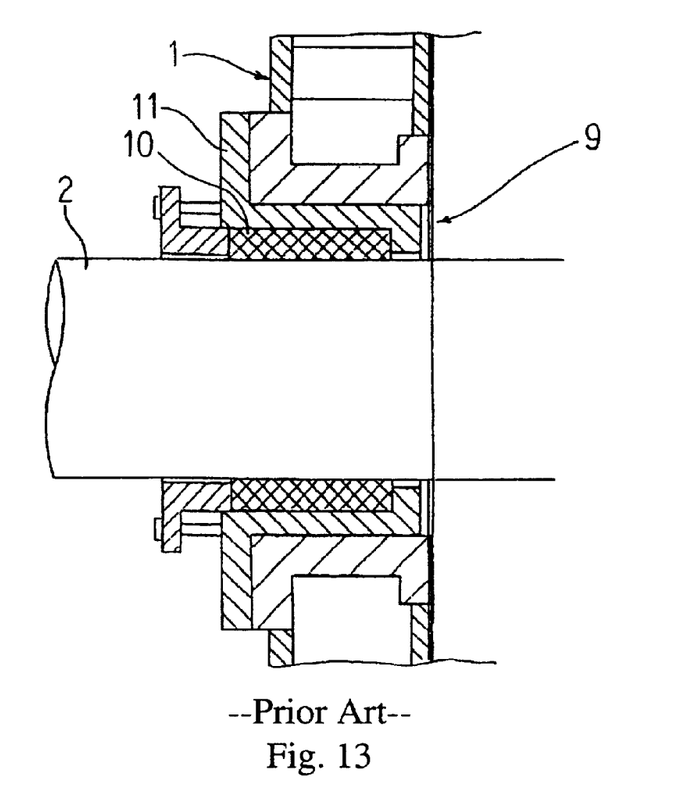
FIG. 13 is a cross sectional view of a primary part of a conventional sealing configuration between the rotary shaft and the housing in the double-screw kneader.

Each the rotary shaft 2 is supported at both ends by two bearing units 8 between which the housing 1 is mounted. A stuffing box 11 containing a ground packing 10 is provided at each of four journal locations 9 where the two rotary shafts 2 extend through the housing 1, as shown in FIG. 13, for sealing between the housing 1 and the rotary shaft 2.

However, such a conventional sealing scheme using the ground packing 10 for sealing between the rotary shaft 2 and the housing 1 has a disadvantage that the packing 10 is easily worn out and has to be replaced by a new one at higher frequency. More specifically, the highly viscous dope kneaded in the rotary apparatus may sneak beneath the packing 10 and act as an abrasive. This causes the packing 10 to be worn out within a short duration of time. Accordingly, the packing 10 has to be frequently replaced by a new one while the operation is paused. As a result, the productivity will significantly be declined.

The packing 10 may be replaced by a mechanical seal which comprises a rotary ring mounted to the rotary shaft and a stationary ring mounted to the housing. The rings are generally fabricated of a highly wear-resistant material such as carbide alloy or ceramic. As the rotary shaft rotates, the rotary ring and the stationary ring set axially in direct contact with each other can be slid relatively at their ends thus producing a sealing effect.

However, when the mechanical seal installed in the rotary apparatus such as an acetylator also is attached by the highly viscous dope, the relative sliding movement of the rotary ring and stationary ring may be impaired. As a result, the sealing is deteriorated and stable sealing is not maintained only by a mechanical seal.

For improvement, the mechanical seal may be accompanied with a cylindrical screw sleeve which has a spiral groove provided in the outer side thereof and is mounted on the rotary shaft inwardly of the mechanical seal. As the screw sleeve is rotated together with the rotary shaft, the spiral groove drives the dope running towards the mechanical seal to return back into the housing. Such a shaft sealing apparatus made of a combination of the screw sleeve and the mechanical seal is provided for preventing the dope from reaching the mechanical seal, thus obtaining a more preferable sealing on the whole.

However, in the rotary apparatus such as a kneader for kneading a highly viscous material described above, the mounting or dismounting of the screw sleeve on the rotary shaft at the installation or maintenance process requires a significant labor. More particularly, for mounting, the screw sleeve has to be first fitted onto a corresponding end of the screw sleeve and then moved axially to the installation location on the rotary shaft where the rotary shaft penetrates through the housing. It is hence necessary at the mounting process to disassemble or dismount various gears coupled to the rotary shaft and bearing units supporting the rotary shaft. Accordingly, the mounting and dismounting of the screw sleeve will more be complicated. Also, the dismounting and mounting the gears and the bearing units will take a considerable length of time and labor, thus declining the productivity.

SUMMARY OF THE INVENTION

The present invention has been developed in view of the above-described drawbacks and an object is to provide a shaft sealing apparatus which can be mounted and dismounted on the rotary shaft with much ease thus increasing the operating rate and improving the productivity of a rotary apparatus.

In an embodiment, a shaft sealing apparatus may include a screw sleeve which has a spiral groove provided in the outer side thereof and is mounted to a rotary shaft at a location where the rotary shaft penetrates through a housing for rotation together with the rotary shaft thus to push back a material into the interior of the housing and is characterized in that the screw sleeve is separated in the circumferential direction and circumferential direction separated segments are then jointed to each other to assemble a generally cylindrical structure on the periphery of the rotary shaft.

As the screw sleeve of this arrangement is circumferentially separated into segments which can then be mounted and dismounted on the rotary shaft from radially outward directions at the location adjacent to the housing. Since it is not necessary to disassemble the bearing units which support the rotary shaft at the outside of the housing, the mounting and dismounting operation becomes easy. As a result, the rotary apparatus can be increased in the operating rate and thus improved in the productivity.

In another embodiment, the shaft sealing apparatus may be modified in which the screw sleeve is axially separated into axial separated units, the circumferential separated segments of each axial separated unit being jointed together with the mating face between their mating faces offset from that of the circumferential separated segments of another adjacent axially separated unit, and the axial separated units are jointed to one another along the axial direction.

In this arrangement, the surface of the circumferential separated segments in each axial separated unit are axially coupled at a location which is crossed by the circumferential separated segments in another adjacent axial separated unit. Also, when the circumferential separated segments of each axial separated unit are forced outwardly and radically by a centrifugal force during the rotating action, they remain jointed to those of another adjacent axially separated unit. Accordingly, the displacement of the circumferential separated segments as described above due to the centrifugal force can be avoided and the jointing of the screw sleeve to the rotary shaft can be maintained with higher precision.

Even if each axial separated unit is circumferential separated into the segments, the location at which the separated segments are coupled is offset from that of another axial separated unit. This allows each axial separated unit to function as a coupling member resisting against the centrifugal force. Accordingly, the jointing of the segments and units as the screw sleeve on the rotary shaft can remain at high precision regardless of an increase in the rotating speed. As an eccentricity between the screw sleeve and the rotary shaft is inhibited, the shaft sealing apparatus can be minimized in vibration thus contributing to the stable operation of the rotary apparatus.

As the screw sleeve is separated circumferentially and axially, it may be desirable, in an embodiment, that the screw sleeve includes six semicircular separate segments fabricated by dividing circumferentially into two and axially into three. This will further improve the above-described effect and also minimize the number of the components. As a result, the overall cost of the shaft sealing apparatus can successfully be reduced.

In yet another embodiment, the shaft sealing apparatus may be modified in which there is provided a space between the inner surface of the screw sleeve and the outer surface of the rotary shaft, the crew sleeve is mounted to the outer surface of the rotary shaft by annular members made of a resilient material provided in the space in-between.

That is, after the above-described screw sleeve is assembled cylindrically on the periphery of the rotary shaft outwardly of the housing, it is necessary to move along the rotary shaft in the manner that at least the inward is located in the housing. Therefore, it is essential to have the screw sleeve loosely held on or spaced by a clearance from the periphery of the rotary shaft.

This is implemented by a set of annular resilient members such as O-rings provided between the screw sleeve and the rotary shaft. As the circumferential separated segments have been jointed together on the rotary shaft, it is contemplated that the annular resilient members between the inner surface of the screw sleeve and the outer surface of the rotary shaft remain urged properly along radial directions. Accordingly, the generally coaxial jointing between the screw sleeve and the rotary shaft can be maintained by the action of a substantially uniform resilient force of the annular resilient members throughout the shaft sealing apparatus. Also, this allows the screw sleeve to be axially moved to its predetermined location on the rotary shaft.

In case that the clearance between the screw sleeve and the rotary shaft is minimized without providing the above-described resilient members, the screw sleeve may fractionally vibrate and come in frequent contact with the rotary shaft repeatedly at different locations. This will result in the worn-out of each component thus causing a deviation from the center axis and declining the precision of the assembly.

On the contrary, since the use of the resilient members inhibits direct contact between the screw sleeve and the rotary shaft due to small vibrations, the worn-out can be minimized. As a result, the installation of the screw sleeve on the rotary shaft remains at high precision and the operation of the rotary apparatus with the shaft sealing apparatus can be held stably, thus improving the productivity.

In yet further embodiments, the shaft sealing apparatus may further include a mechanical seal provided on the rotary shaft outwardly of the screw sleeve, which may include a rotary ring and a stationary ring coupled to each other along the axial direction, each ring circumferential separated into segments which are then jointed together to sandwich the rotary shaft.

As the mechanical seal is provided on the outside of the screw sleeve, it can be prevented a highly viscous material from reaching the mechanical seal in case that highly viscous material such as the above-described dope is kneaded. Therefore, the mechanical seal surely prevents leakage of atmosphere gas or vapor gas from the housing and the sealing is maintained stably as a whole. Also, since each of the rotary ring and the stationary ring of the mechanical seal is separated circumferentially, the mechanical seal can simply be mounted and dismounted without disassembling the bearing units supporting the rotary shaft as well as the screw sleeve.

BRIEF DESCRIPTION OF THE DRAWINGS

FIG. 3 illustrates a center ring of the screw sleeve, FIG. 3(a) being a front view and FIG. 3(b) being a cross sectional view taken along the line Y—Y of FIG. 3(a);

DETAILED DESCRIPTION OF THE PREFERRED EMBODIMENT

Figure 1:
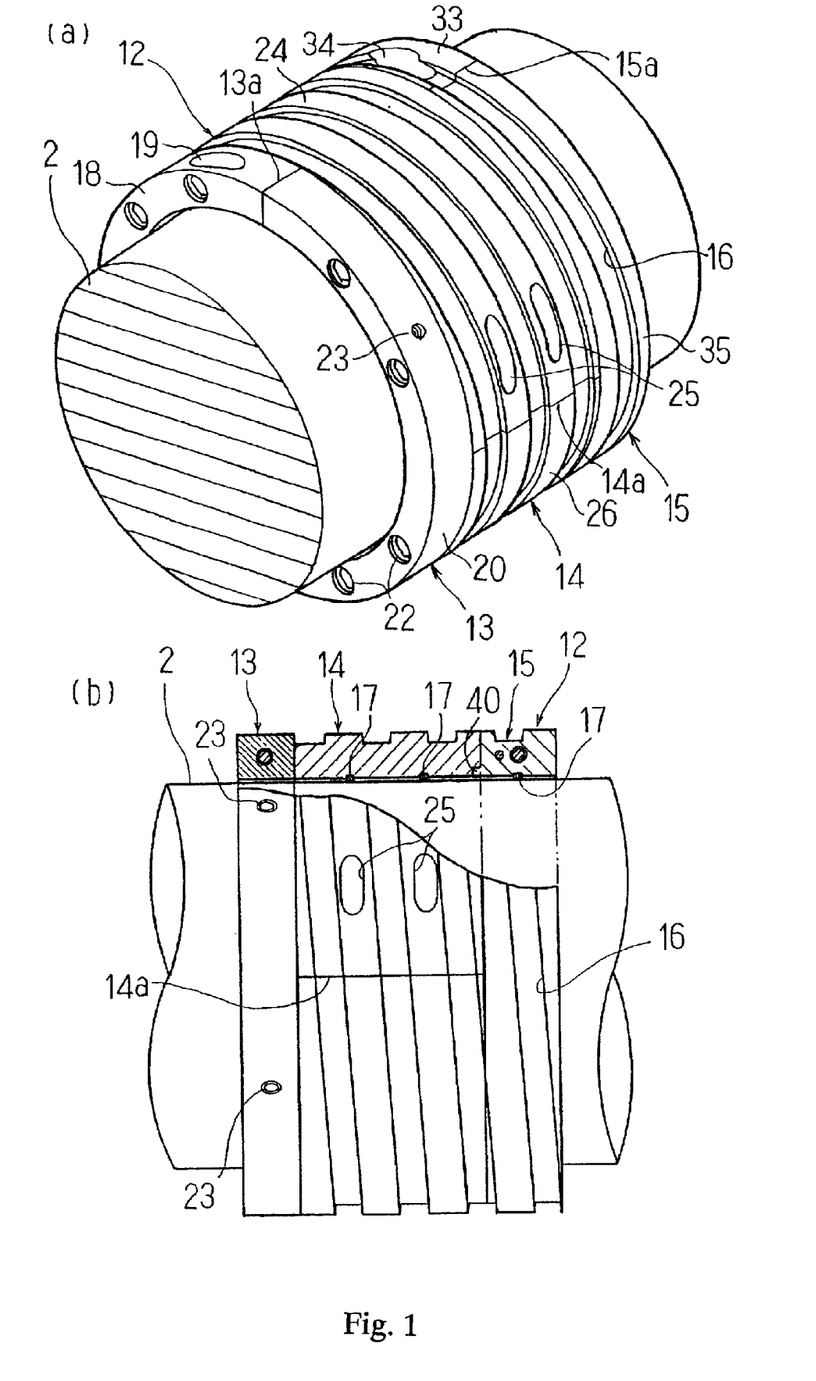
FIG. 1 illustrates a screw sleeve in a shaft sealing apparatus according to one embodiment of the present invention, FIG. 1(a) being a perspective view and FIG. 1(b) being a partially cut-out cross sectional view.

One embodiment of the present invention will be described in detail referring to the drawings. A shaft sealing apparatus of this embodiment comprises a screw sleeve which replaces a ground packing 10 provided in a stuffing box 11 of a double-screw kneader shown in FIGS. 11 and 12, and a mechanical seal covering the external side of the stuffing box 11. The configuration of the screw sleeve is now explained referring to FIG. 1.

As shown in FIGS. 1(a) and 1(b), the screw sleeve 12 in this embodiment consists mainly of three axial separated units 13 to 15 separated along the axis of a rotary shaft 2 and jointed axially to each other. For ease of the description, the three separated units are referred to, from left in the drawing, as an open-air side ring 13, a center ring 14, and an interior side ring 15 hereinafter.

The three rings 13 to 15 are identical in the outer and inner diameter and arranged of an annular shape. The center ring 14 and the interior side ring 15 have a spiral groove 16 provided in the outer side thereof extending from the rightward end of the interior side ring 15. Also, as best shown in FIG. 1(b), O-rings (annular members) 17 are mounted at two locations, i.e. both axial ends of a central region of the center ring 14, and another location, i.e. substantially the axial center of the interior side ring 15, between the inner sides of the rings 13 to 15 and the outer side of the rotary shaft 2. The three rings 13 to 15 are assembled on the rotary shaft 2.

Figure 2:
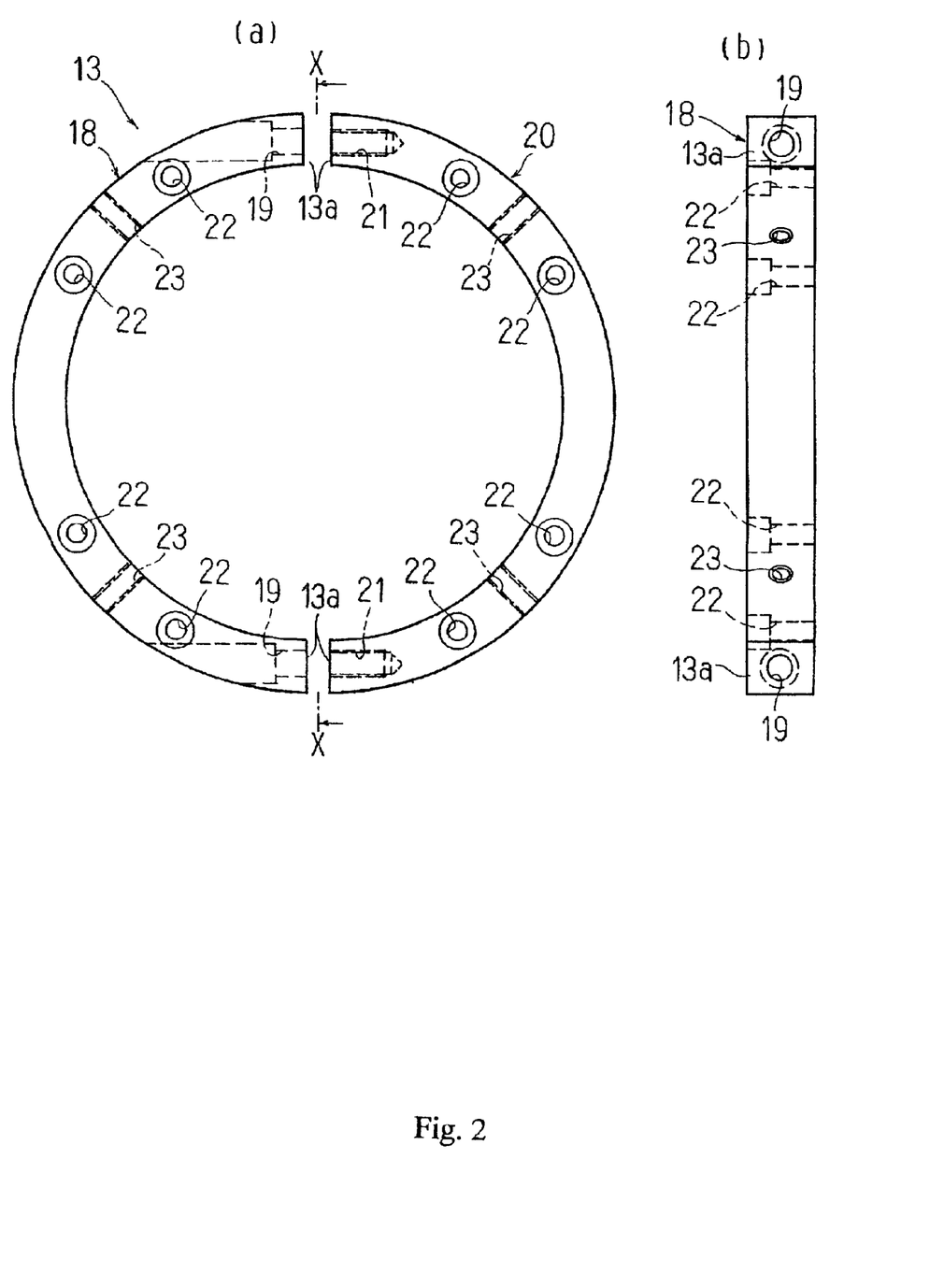
FIG. 2 illustrates an open-air side ring of the screw sleeve, FIG. 2(a) being a front view and FIG. 2(b) being a cross sectional view taken along the line X—X of FIG. 2(a)

The open-air side ring 13 is separated along the vertical center line into two, left and right, segments denoted by 18 and 20 in FIG. 2(a). The semicircular left half separate segment (referred to as a separate segment hereinafter) 18 has a couple of bolt insertion holes 19 provided in two upper and lower separated end surfaces (referred to as mating faces hereinafter) 13a thereof respectively so that each hole extends at a right angle to the mating face. A spot facing is provided in the hole 19 at the other end than the mating faces 13a as arranged greater in the inner diameter than the hole 19 for accepting the head of a bolt which will be explained later.

On the other hand, a couple of female screws 21 are provided in the two, upper and lower, mating faces 13a of the semicircular right half separate segment 20 to extend at a right angle to the mating faces 13a, as shown in FIG. 2(a). As a pair of bolts (not shown) are inserted through the bolt holes 19 in the left separate segment 18 and threaded into the female screws 21 of the right separate segment 20, the two mating faces 13a are coupled to each other to joint between the two separate segments 18 and 20, thus forming a cylindrical assembly.

Each of the separate segments 18 and 20 of the open-air side ring 13 has a plurality of center ring jointing holes 22, i.e. four in this embodiment, provided therein at proper intervals along the circumference extending axially as shown in FIG. 2(b). The center ring jointing holes 22 are also formed with spot facings for the same purpose. Moreover, each of the separate segments 18 and 20 has two set screw engaging female screws 23 provided therein between any two center ring jointing holes 22 extending through radially.

Figure 3:
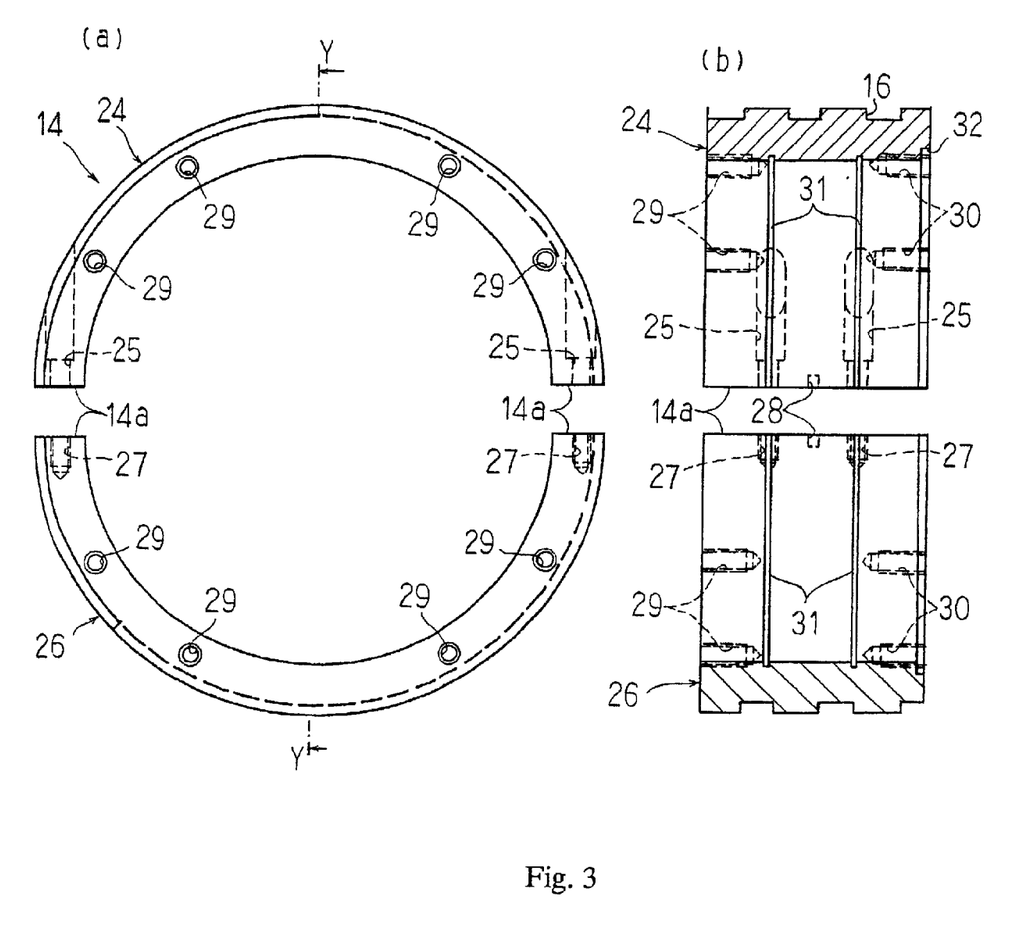

Referring to FIG. 3(a), the center ring 14 like the open-air side ring 13 is circumferentially separated into two, upper and lower, segments 24 and 26. The two segments 24 and 26 are jointed to each other hence forming an annular assembly. More specifically, they are jointed to the annular form by each bolt (not shown) inserted through a bolt insertion hole 25 provided in a mating face 14a of the upper segment 24 and threaded into a female screw 27 provided in a mating face 14a of the lower segment 26.

Since the center ring 14 is greater in the axial length than the open-air side ring 13, a pair of its bolt insertion holes 25 and female screws 27 are located for tightening with the bolts at two parts spaced from each other along the axial direction as shown in FIG. 3(b). A pin hole 28 is provided at substantially the center of the axial length in each mating face 14a. With knock pins (not shown) inserted into the pin holes 28, the two segments 24 and 26 can precisely be positioned with no displacement along the axial direction.

Also, the center ring 14 has female screws 29 provided in the outward end thereof (at the left side end surface in FIG. 3(b)) extending axially to face the corresponding center ring jointing holes 22 of the open-air side ring 13. When bolts (not shown) are inserted through the center ring jointing holes 22 of the open-air side ring 13 and threaded into the corresponding female screws 29 in the center ring 14, the open-air side ring 13 and the center ring 14 are axially jointed to each other.

The center ring 14 has interior side ring jointing female screws 30 provided at the location the female screws 29 extending axially in the inward end thereof (at the right side end surface in FIG. 3(b)). The inner side of the center ring 14 has two O-ring grooves 31 provided therein where the O-rings 17 are fitted in. The inner side of the center ring 14 also has an in-low recess 32 provided therein at the inward end, where the inner diameter is slightly increased, for accepting an annular projection 40 of the interior side ring 15 which is described later.

Figure 4:
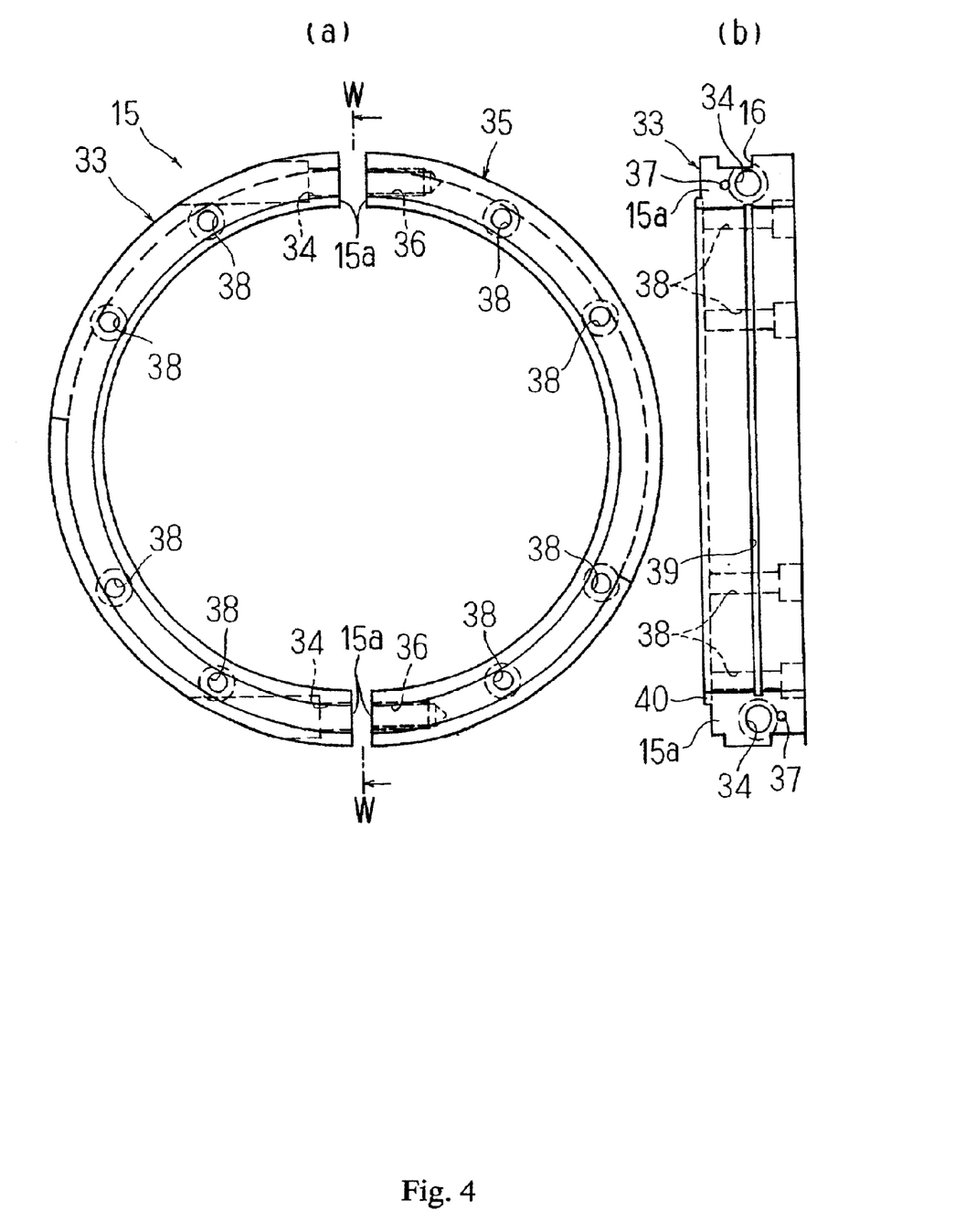
FIG. 4 illustrates an interior side ring of the screw sleeve, FIG. 4(a) being a front view and FIG. 4(b) being a cross sectional view taken along the line W—W of FIG. 4(a)

As shown in FIG. 4(a), the interior side ring 15 is equally separated into two, left and right, segments 33 and 35. When a pair of bolts (not shown) are inserted through bolt insertion holes 34 provided in the two mating faces 15a of the left segment 33 and threaded into corresponding female screws 36 provided in the two mating faces 15a of the right segment 35, the two segments 33 and 35 are jointed to each other thus forming an annular assembly.

The interior side ring 15 has a pin hole 37 provided in each the mating face 15a as shown in FIG. 4(b). As shown, the pin hole 37 in the mating face 15a at the upper is positioned outwardly of the axial center (towards the left in FIG. 4(b)) while the pin hole 37 in the mating face 15a at the lower is positioned inwardly of the axial center (towards the right). As knock pins (not shown) are inserted into the pin holes 37, the two segments 33 and 35 can precisely be positioned and jointed to each other with no axial displacement.

The interior side ring 15 has bolts insertion holes 38 provided axially in the outward end thereof at the location opposite to the interior ring jointing female screws 30 of the center ring 14 as arranged with spot facings provided at the inward end thereof. As bolts (not shown) are inserted through the hold insertion holes 38 and threaded into the corresponding interior side ring jointing female screws 30 in the center ring 14, the interior side ring 15 and the center ring 14 are axially jointed to each other.

The interior side ring 15 has an O-ring grooves 39 provided at substantially the axial center in the inner side thereof where the O-ring 17 is fitted in. Also, the outward end of the interior side ring 15 has the annular projection 40 provided thereon projecting outwardly. As its annular projection 40 is fitted into the in-low recess 32 provided in the center ring 14, the interior side ring 15 is coaxially positioned in alignment and securely jointed to the center ring 14.

The open-air side ring 13, the center ring 14, and the interior side ring 15 all may be fabricated by a heat-resistant, corrosion-resistant stainless steel material such as SUS316. It is assumed as a preferable example that when the screw sleeve 12 is mounted to the rotary shaft 2 having a diameter of 210 mm, an open-air side ring 13, center ring 14, and interior side ring 15 are 257 mm in the outer diameter and in the axial length 30 mm, 100 mm and 40 mm respectively, a total length being thus 170 mm. The inner diameter may be greater by 70 µm than the outer diameter of the rotary shaft 2.

A procedure of mounting the screw sleeve 12 fabricated in the above arrangement to the stuffing box 11 of a two-axis kneader explained with FIGS. 11 and 12 will now be described referring to FIGS. 5 to 9.

Figure 5:
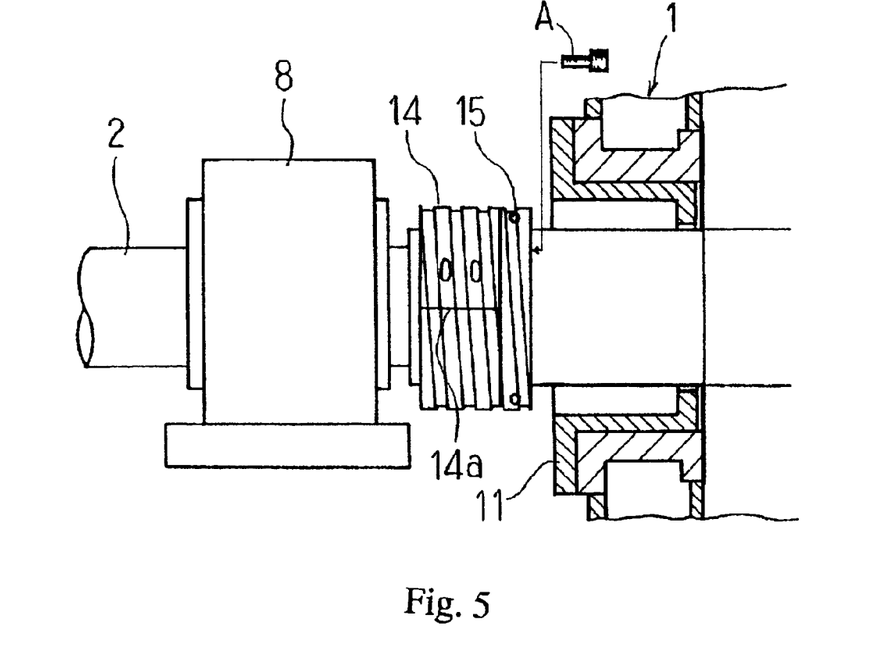
FIG. 5 is a cross sectional view of a primary part where the center ring and the interior side ring are mounted on the rotary shaft during the process of mounting the screw sleeve on the rotary shaft.

As shown in FIG. 5, the two separate segments 18 and 20 are radially mounted from both sides and jointed to each other by bolts to assemble the interior side ring 15 between a housing 1 and a bearing unit 8 in the two-axis kneader. Similarly, the two separate segments 24 and 26 are jointed to each other by bolts to assemble the center ring 14 at the location outwardly of the interior side ring 15. Simultaneously, the center ring 14 and the interior side ring 15 are aligned and coupled with each other so that their O-ring grooves 31 and 39 have the O-rings 17 fitted therein.

The center ring 14 and the interior side ring 15 are then tightened to each other by tightening bolts A inserted axially through the bolt insertion holes 38 of the interior side ring 15 and threaded into the corresponding interior side ring jointing female screws 30 of the center ring 14.

In particular, the bolt insertion holes 38 are not identical in the circumferential arrangement to the female screws 30. The bolt insertion holes 38 can be aligned with the female screws 30 along the axial direction when the mating faces 15a of the interior side ring 15 are circumferentially dislocated by 90 degrees from the mating faces 14a of the center ring 14. Accordingly, the interior side ring 15 and the center ring 14 are axially jointed to each other as they are circumferentially dislocated by 90 degrees from each other.

The O-ring grooves 31 and 39 have a cross section sized slightly smaller than the required size of the O-ring groove. Consequently, the O-rings 17 when installed may produce a greater resilient force than the normal level throughout their length. This allows the inner sides of the center ring 14 and the interior side ring 15 to be equally spaced from the outer side of the rotary shaft 2, hence holding both the center ring 14 and the interior side ring 15 coaxial with the rotary shaft 2.

Figure 6:
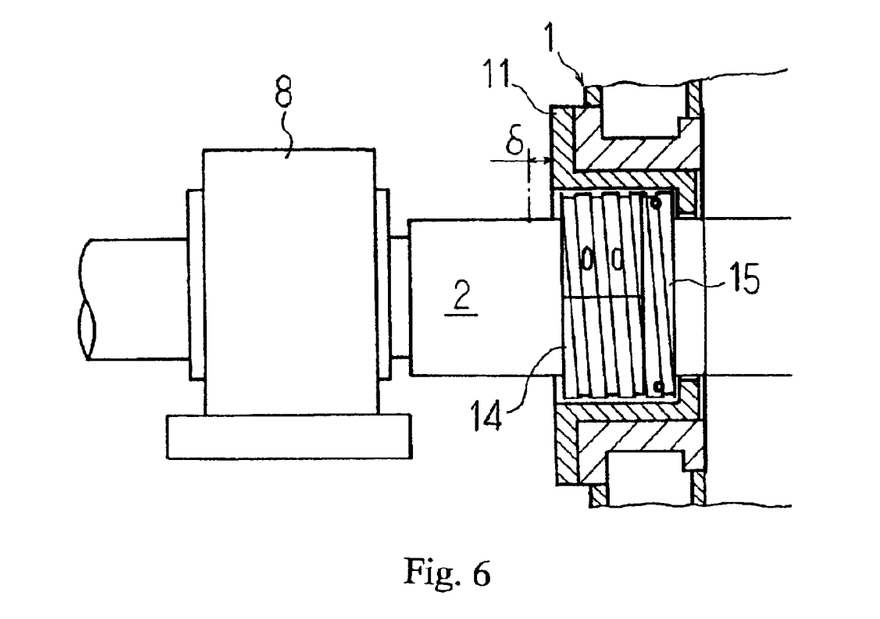
FIG. 6 is a cross sectional view of a primary part where the center ring and the interior side ring are slid inwardly after the step shown in FIG. 5.

Then, the center ring 14 and the interior side ring 15 assembled on the rotary shaft 2 are transferred into the stuffing box 11 as shown in FIG. 6. At the time, the two rings 14 and 15 are closely held to the outer side of the rotary shaft 2 by the resilient action of the O-rings 17 being compressed radially. Preferably, the outer side of the rotary shaft 2 may be coated with a lubricant. Accordingly, the two rings 14 and 15 can inwardly be transferred with the O-ring 17 directly slid on the outer side of the rotary shaft 2 when urged by a proper pressing force towards the interior.

It is desired in the transfer action to move the two rings 14 and 15 to 2–3 mm deeper than the designed position so that the outermost edge of the center ring 14 is positioned deeper than the end of the stuffing box 11, i.e. a space for mounting the open-air side ring 13 is provided. Also, a marking for defining the position of the open-air side ring 13 is provided on the outer side of the rotary shaft 2 at a prescribed distance δ outwardly from the end of the stuffing box 11.

Figure 7:
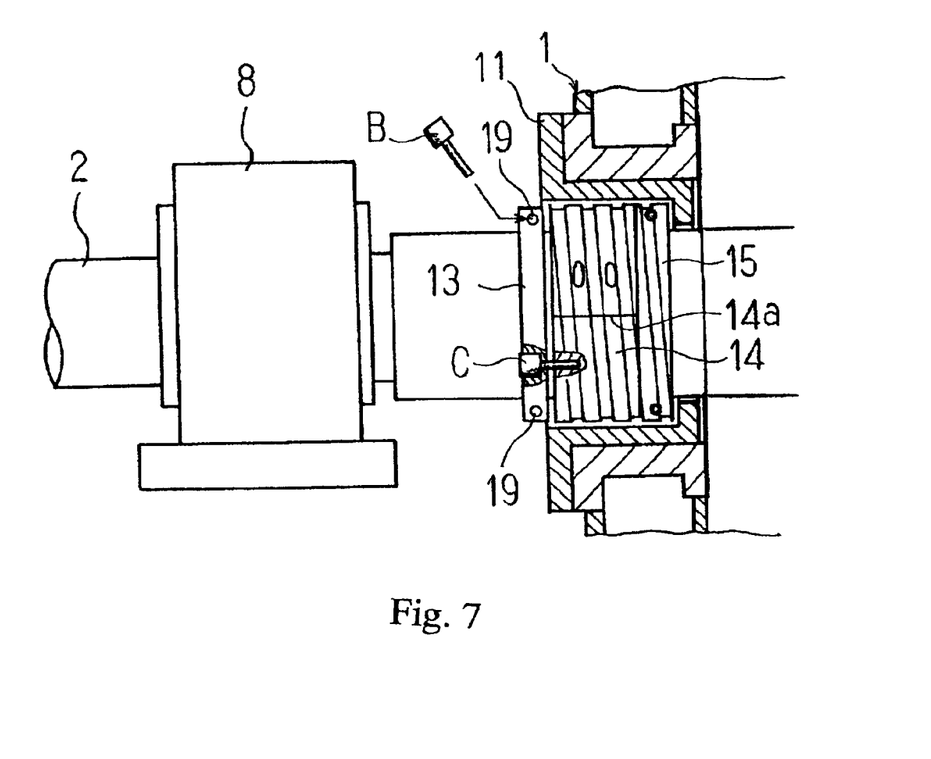
FIG. 7 is a cross sectional view of a primary part where the open-air side ring is mounted on the rotary shaft after the step shown in FIG. 6.

Then, as shown in FIG. 7, the two separate segments 18 and 20 are mounted and jointed to each other by tightening bolts B inserted through the bolt insertion holes 19 to assemble the open-air side ring 13 of an annular shape on the rotary shaft 2. The tightening bolts B are loosely threaded so that the ring 13 can be slid to the desired position and turned circumferentially by hand on the shaft 2. The open-air ring 13 is turned circumferentially until the mating faces 13a of the open-air side ring 13 are dislocated by 90 degrees from the mating faces 14a of the center ring 14. As a result, the center ring jointing holes 22 of the open-air side ring 13 are axially aligned with the female screws 29 of the center ring 14. As the open-air side ring 13 has slightly been moved along both the circumferential direction and the axial direction for fine alignment, it is lightly tightened to the center ring 14 by tightening bolts C inserted through the center ring jointing holes 22 and threaded.

When the open-air side ring 13 has been moved to the marking on the rotary shaft 2, the tightening bolts B lightened threaded are tightened to secure the open-air side ring 13 to the rotary shaft 2. The mating faces 13a of the open-air side ring 13 are sized by polishing so that they are spaced by substantially 1 mm from each other when mounted and jointed on the rotary shaft 2. This allows the tightening bolts B to tighten the open-air side ring 13 to the rotary shaft 2 at a pressure urged throughout the inner side of the ring 13. In addition, the screw sleeve 12 receives a large force due to the resistance of a viscous fluid. For improving the tightness, set screws(not shown) are threaded into the set screw jointing female screws 23 provided in the open-air side ring 13. With the set screws tightly threaded towards the rotary shaft 2, the open-air side ring 13 can more firmly be tightened to the rotary shaft 2.

Figure 8:
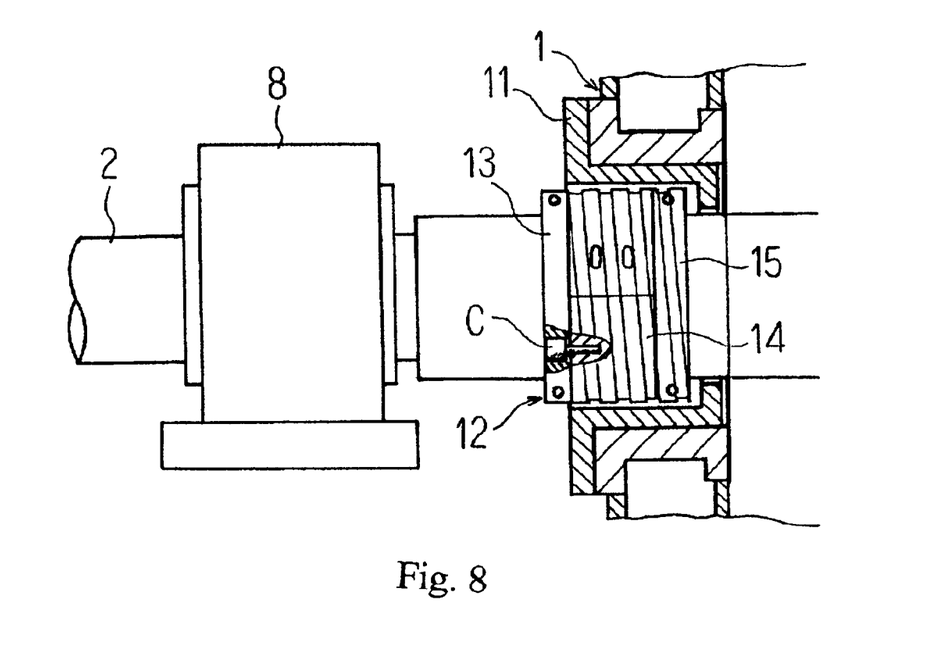
FIG. 8 is a cross sectional view of a primary part where the center ring and the interior side ring are drawn to the open-air side ring after the step shown in FIG. 7.

After the open-air side ring 13 is firmly tightened at a prescribed position to the rotary shaft 2, the tightening bolts B light threaded are tightened up. Accordingly, as shown in FIG. 8, the center ring 14 and the interior side ring 15 are drawn and coupled to the open-air side ring 13. Then, the assembling of the three rings 13 to 15 on the screw sleeve 12 is completed.

Figure 9:
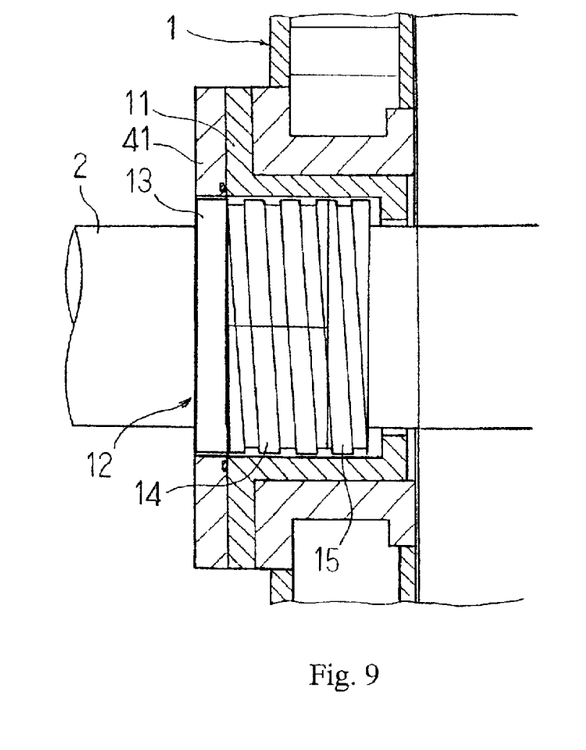
FIG. 9 is a cross sectional view of a primary part where a mount flange is mounted to the housing after the step shown in FIG. 8.

As assembled, the open-air side ring 13 stays outside the end (of the stuffing box 11) of the housing 1. Then, a mount flange 41 which is substantially identical in the thickness to the open-air side ring 13 is mounted to the end of the stuffing box 11, as shown in FIG. 9. The mount flange 41 is also separated into two segments which are hence mounted radially from outside and jointed to each other on the open-air side ring 13 at the end of the stuffing box 11 as described above. The assembling procedure of the shaft sealing apparatus of this embodiment will be finished after a mechanical seal is provided with the use of the mount flange 41.

In the two-axis kneader equipped with the above described shaft sealing apparatus, a dope is kneaded in the housing 1 and a portion moved into the space between the outer side of the screw sleeve 12 and the inner side of the stuffing box 11 is successfully returned along the spiral groove 16 to the inside of the housing 1 by the rotation of the screw sleeve 12 driven by the rotary shaft 2. As a result, the dope in the housing 1 can be prevented from escaping from the space between the screw sleeve 12 and the stuffing box 11.

As the dope is prevented by the action of the screw sleeve 12 from escaping from the stuffing box 11, the sealing function of the mechanical seal can be ensured. Accordingly, the sealing is maintained throughout the kneader hence hardly permitting atmosphere gas or vapor gas to be released to the outside. Since the screw sleeve 12 for protecting from leakage of a dope is fabricated by a highly corrosion-resistant, heat-resistant metal, its worn-out can be more retarded than that of conventional ground packings. Accordingly, the operational life will be stabilized throughout a long run service with minimum jobs of the replacement and maintenance.

Figure 10:
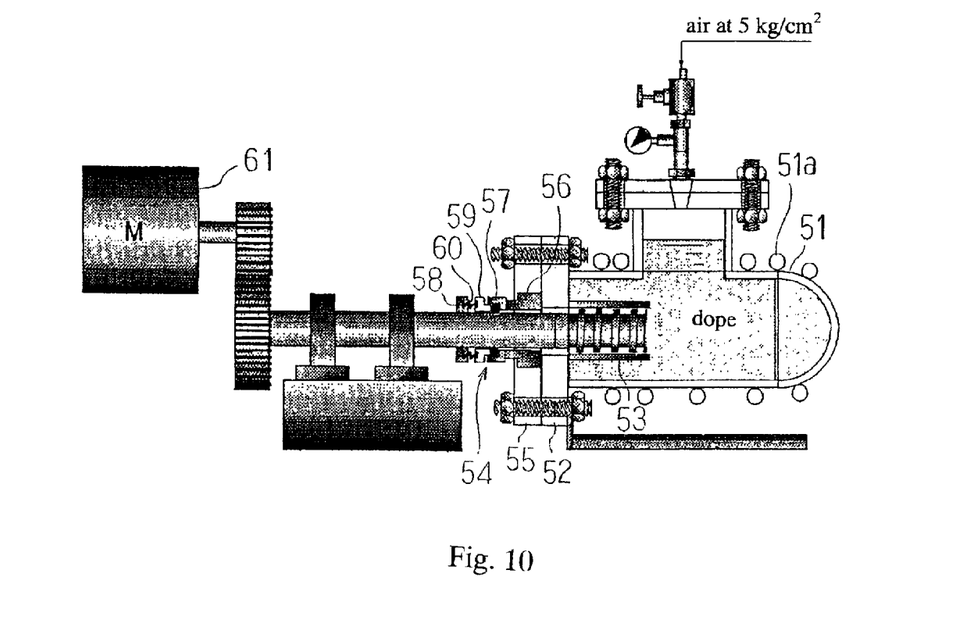
FIG. 10 is an explanatory view of a configuration of a test device for proving the sealing effect of the screw sleeve.

FIG. 10 illustrates a schematic arrangement of a test device for proving the sealing effect of the screw sleeve 12 of this embodiment. Denoted by 51 is a reservoir equivalent to the housing 1 of the two-axis kneader. The front end of the rotary shaft 2 on which the screw sleeve 12 is mounted extends through the center hole of the flange 52 into one end of the reservoir 51. The screw sleeve 12 is covered with an outer cylinder 53 which is fixedly mounted to the inner end of the flange 52.

The mechanical seal 54 is provided outside the flange 52. The mechanical seal 54 is provided with a stationary ring 56 fixedly mounted by a retaining flange 55 to the outer end of the flange 53 and a rotary ring 57 disposed axially in contact with the stationary ring 56. A retaining ring 58 and a pressing member 59 are mounted on the rotary shaft 2 outwardly of the rotary ring 57. As the pressing member 59 is urged in the axial direction by the yielding force of a spring member 60 provided between the retaining ring 58 and the pressing member 59, it holds the rotary ring 57 and the stationary ring 56 in direct contact with each other axially. This contact remains while the rotary ring 57 and the rotary shaft 2 rotate together, hence providing the sealing effect at each interface. Denoted by 61 is a motor for rotating the rotary shaft 2.

A test was carried out with the test device starting with supplying a vapor to a trace 51a wound on the outer side of the reservoir 51 to hold the reservoir 51 at a prescribed temperature. Then, the reservoir 51 was filled with a dope before closed off and supplied with air to increase the inner pressure to 5 kg/cm$^2$G. The test device was driven at 30 rpm for 30 minutes and 15-minutes stop action was repeated six batch times. After the action, no leak at the mechanical seal 54 was found. Then, the inner pressure was released and the dope was drained out. After removal of the mechanical seal, it was proved that no sign of leakage of the dope between the screw sleeve 12 and the outer cylinder 53.

The shaft sealing apparatus of this embodiment has the flange 52 of FIG. 10 replaced by the mount flange 41 of FIG. 9 as equipped with the mechanical seal shown in FIG. 10. Each of the rotary ring and the stationary ring comprises two separate segments like those rings of the screw sleeve 12.

As described, each component of the screw sleeve 12 of this embodiment is circumferentially separated into two segments and can thus be mounted and dismounted on the rotary shaft 2 without disassembling the bearing units 8 which support the rotary shaft 2. Accordingly, the activity rate of the kneader will be improved thus increasing the productivity.

Also, the screw sleeve 12 of this embodiment comprises three axially aligned, different components; the open-air side ring 13, the center ring 14, and the interior side ring 15. The mating faces 13a to 15a of the three rings 13 to 15 are different in the circumferential position while jointed to one another along the axial direction. Even if the centrifugal force generated during the rotating action causes the two segments of each ring to be displaced in radially opposite directions, the three rings assembled in a single unit can hold each other securely. As a result, any deflection of the screw sleeve 12 from the rotary shaft 2 will be minimized thus permitting no vibration. Consequently, the action of the kneader will be ensured stable.

The screw sleeve 12 in the shaft sealing apparatus of this embodiment is arranged separable into two pieces along the radial direction and three pieces along the axial direction as comprising six semicircular segments. This arrangement allows the above effect to be emphasized as is composed of a less number of the separate segments, whereby the overall cost of the apparatus can significantly be reduced.

The embodiment also includes the O-rings 17 mounted between the screw sleeve 12 and the rotary shaft 2 so as to provide their resilient forces uniformly throughout the circumference, thus allowing the screw sleeve 12 and the rotary shaft 2 to be held substantially coaxial with each other. As a result, the screw sleeve 12 installed in the stuffing box 11 can be rotated at a minimal clearance from the inner wall of the stuffing box 11 and the sealing effect for inhibiting leakage of the dope can highly be guaranteed. Moreover, in case that other components of the kneader are frequently dismounted and mounted, their assembling process can be conducted at higher precision and repeatability.

Since the O-rings 17 are provided in-between, the screw sleeve 12 and the rotary shaft 2 can be prevented from coming into direct contact with each other locally due to their vibration and speeding their worn-out. Accordingly, the installation of the screw sleeve 12 on the rotary shaft 2 will remain at high precision.

The mechanical seal including the rotary ring and the stationary ring, each separable circumferentially into two segments, is provided on the outer side of the screw sleeve 12. A highly viscous dope kneaded in the housing 1 can thus be prevented by the action of the screw sleeve 12 from reaching the mechanical seal. The mechanical seal can surely prevent atmosphere gas or vapor gas from escaping out from the housing 1. As each of the rotary ring and the stationary ring of the mechanical seal are circumferentially separated into two segments, it can easily be dismounted and mounted without disassembling the bearing units which support the rotary shaft 2.

The present invention is not limited to the embodiment described above and various modifications will be made without departing the scope of the present invention. For example, while the screw sleeve 12 is separable into two pieces along the circumferential direction and three pieces along the axial direction, it may be separated into a different number of segments as defined in claim 1 or 2.

The bolt insertion holes 25 with spot facings are provided in the mating faces 14a of one segment of the center ring 14 while the female screws 36 are provided in the mating faces 14a of the other segment of the same for jointing the two segments together. The bolt insertion boles 25 and the corresponding female screws 36 may be positioned in symmetry about the center point. This will prevent the stepped spaces or spot facings from being located bias at one of the two segments. As a result, the weight balance along the circumferential direction will be improved thus minimizing the generation of vibration during the rotating action.

While the shaft sealing apparatus of the said embodiment is installed in the kneader used as an acetylator in the production of cellulose acetate, it may equally be applied to a rotary apparatus for kneading a highly viscous material in a step of producing a polymer such as cellulose propionate, carboxy methyl cellulose, nylon, polyester, polycarbonate, or hydroxy ethyl cellulose.

The shaft sealing apparatus of the said embodiment has the mechanical seal provided on the outside of the screw sleeve 12. It may be arranged with the mechanical seal replaced by any other sealing mechanism cooperated with the screw sleeve 12 or a simple provision of the screw sleeve 12 with no mechanical seal, as defined in claims 1 to 4.

As described above, the shaft sealing apparatus defined in claim 1 of the present invention has the screw sleeve circumferentially separated into multiple segments which can thus be mounted and dismounted on the rotary shaft without disassembling the bearing units supporting the rotary shaft. Accordingly, a rotary apparatus employing the shaft sealing apparatus can be increased in the activity rate and thus improved in the productivity.

The shaft sealing apparatus according to claim 2 has the circumferentially separated segments of each axially separated unit of the screw sleeve jointed together with the interface between their mating faces offset from that of the circumferentially separated segments of another adjacent axially separated unit. This allows the circumferentially separated segments to be accurately assembled and mounted on the rotary shaft regardless of the effect of any centrifugal force generated during the rotation. As a result, eccentricity between the screw sleeve and the rotary shaft can be minimized thus preventing the generation of unwanted vibration. The operation of the rotary apparatus with the screw sleeve can hence be maintained stable.

The shaft sealing apparatus according to claim 3 has the screw sleeve composed of the six semicircular separated segments fabricated by dividing circumferentially into two and axially into three. This improves the above-described advantage and decreases the number of the components to be used, hence contributing to the lower production cost of the apparatus.

The shaft sealing apparatus according to claim 4 has the annular member of a resilient material provided between the inner surface of the screw sleeve and the outer surface of the rotary shaft for providing a substantially uniform resilient force throughout the circumference, thus holding the screw sleeve generally coaxial with the rotary shaft. Also, the screw sleeve and the rotary shaft will be prevented from frequently coming into direct contact with each other due to fractional vibrations and thus from being worn out locally, thus the installation of the screw sleeve on the rotary shaft will remain at high precision. As a result, the rotary apparatus with the screw sleeve can be maintained stabile in the operation and improved in the productivity.

The shaft sealing apparatus according to claim 5 has the mechanical seal composed of the rotary ring and the stationary ring, each separated circumferentially into pieces, and provided on the rotary shaft outwardly of the screw sleeve. During the kneading of a high viscous material such as a dope in the housing, the screw sleeve inhibits the highly viscous material from reaching the mechanical seal. As the mechanical seal surely prevents leakage of atmosphere gas or vapor gas from the housing, the sealing effect can be ensured throughout the apparatus. Moreover, as each of the rotary ring and the stationary ring of the mechanical seal is separable along the circumferential direction, the mechanical seal like the screw sleeve can easily be mounted and dismounted on the rotary shaft without disassembling the bearing units.

What is claimed is:

1. A shaft sealing apparatus comprising a screw sleeve which has a spiral groove positioned in the outer side thereof and is mounted to a rotary shaft at a location where the rotary shaft extends through a housing for rotation together with the rotary shaft thus to push back a material into the interior of the housing, wherein the screw sleeve is circumferentially separated into circumferential separated segments which are then jointed to each other to assemble a generally cylindrical structure on the rotary shaft, wherein the screw sleeve is axially separated into axial separated units, and wherein the circumferential separated segments of each axial separated unit being jointed together with the interface between their mating faces offset from that of the circumferential separated segments of another adjacent axial separated unit, and wherein the axial separated units are jointed to one another along the axial direction.

2. The shaft sealing apparatus of claim 1, wherein the screw sleeve comprises six semicircular separate segments fabricated by dividing circumferentially into two and axially into three.

3. The shaft sealing apparatus of claim 2, wherein while there is provided a space between the inner surface of the screw sleeve and the outer surface of the rotary shaft, the screw sleeve is mounted to the outer surface of the rotary shaft by annular members made of a resilient material provided in the space in-between.

4. The shaft sealing apparatus of claim 2, further comprising a mechanical seal provided on the rotary shaft outwardly of the screw sleeve, which comprises a rotary ring and a stationary ring coupled to each other along the axial direction, each ring circumferentially separated into segments which are then jointed together to sandwich the rotary shaft.

5. The shaft sealing apparatus of claim 1, wherein while there is provided a space between the inner surface of the screw sleeve and the outer surface of the rotary shaft, the screw sleeve is mounted to the outer surface of the rotary shaft by annular members made of a resilient material provided in the space in-between.

6. The shaft sealing apparatus of claim 5, further comprising a mechanical seal provided on the rotary shaft outwardly of the screw sleeve, which comprises a rotary ring and a stationary ring coupled to each other along the axial direction, each ring circumferentially separated into segments which are then jointed together to sandwich the rotary shaft.

7. The shaft sealing apparatus of claim 1, further comprising a mechanical seal provided on the rotary shaft outwardly of the screw sleeve, which comprises a rotary ring and a stationary ring coupled to each other along the axial direction, each ring circumferentially separated into segments which are then jointed together to sandwich the rotary shaft.

* * * * *

UNITED STATES PATENT AND TRADEMARK OFFICE
CERTIFICATE OF CORRECTION

PATENT NO.   : 6,871,858 B2
DATED        : March 29, 2005
INVENTOR(S)  : Masanori Futai It is certified that error appears in the above-identified patent and that said Letters Patent is hereby corrected as shown below:

Column 12,
Lines 16 and 22, please delete "claim 2" and substitute therefor -- "claim 1" --.
Line 29, please delete "claim 1" and substitute therefor -- "claim 2" --.
Line 35, please delete "claim 5" and substitute therefor -- "claim 2" --.
Line 42, please delete "claim 1" and substitute therefor -- "cliam 3" --.

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,871,858 B2
DATED : March 29, 2005
INVENTOR(S) : Masanori Futai

It is certified that error appears in the above-identified patent and that said Letters Patent is hereby corrected as shown below:

Column 12,
Lines 16 and 22, please delete "claim 2" and substitute therefor -- "claim 1" --.
Line 29, please delete "claim 1" and substitute therefor -- "claim 2" --.
Line 35, please delete "claim 5" and substitute therefor -- "claim 2" --.
Line 42, please delete "claim 1" and substitute therefor -- "claim 3" --.

Signed and Sealed this

Twelfth Day of July, 2005

JON W. DUDAS
*Director of the United States Patent and Trademark Office*